United States Patent
Schreiber

(10) Patent No.: US 7,211,178 B2
(45) Date of Patent: May 1, 2007

(54) FIXTURE FOR ELECTRO-CHEMICAL MACHINING

(75) Inventor: Karl Schreiber, Am Mellensee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 345 days.

(21) Appl. No.: 10/920,364

(22) Filed: Aug. 18, 2004

(65) Prior Publication Data

US 2005/0016842 A1 Jan. 27, 2005

(30) Foreign Application Priority Data

Aug. 19, 2003 (DE) ................................ 103 39 046

(51) Int. Cl.
B23H 7/26 (2006.01)
B23H 7/30 (2006.01)

(52) U.S. Cl. .......................... 204/297.01; 204/297.02; 204/297.06; 204/297.07; 204/297.08; 204/224 M; 205/645; 205/648; 205/651; 205/686

(58) Field of Classification Search ........... 204/224 M, 204/297.01, 297.02, 297.06, 297.07, 297.08; 205/645, 648, 649, 652, 662, 663, 686

See application file for complete search history.

(56) References Cited

U.S. PATENT DOCUMENTS

| 4,213,834 A | 7/1980 | Semashko et al. |
| 4,257,865 A | 3/1981 | Semashko et al. |
| 4,459,190 A * | 7/1984 | Inoue .......................... 205/654 |
| 5,655,883 A | 8/1997 | Schilling |
| 5,692,881 A | 12/1997 | Leibfried |
| 5,876,651 A | 3/1999 | Blackburn, Jr. et al. |
| 6,033,186 A | 3/2000 | Schilling et al. |
| 6,059,954 A * | 5/2000 | Suda et al. .................. 205/645 |
| 6,764,590 B1 * | 7/2004 | Cochran ...................... 205/654 |
| 2003/0059194 A1 * | 3/2003 | Trzecieski ................... 385/137 |
| 2003/0221973 A1 * | 12/2003 | Heine et al. ................. 205/656 |
| 2004/0140225 A1 * | 7/2004 | Steele et al. ................. 205/652 |
| 2005/0247569 A1 * | 11/2005 | Lamphere et al. .......... 205/663 |

FOREIGN PATENT DOCUMENTS

| CH | 360576 | 4/1962 |
| DE | 2903873 | 8/1979 |
| DE | 19627680 | 1/1998 |
| GB | 846280 | 8/1960 |

OTHER PUBLICATIONS

German Search Report dated Aug. 19, 2003.

* cited by examiner

Primary Examiner—Bruce F. Bell
(74) Attorney, Agent, or Firm—Timothy J. Klima

(57) ABSTRACT

On a fixture for electro-chemical machining for the production of long, curved cavities (11) in a component (12), the working electrode (3) of the electro-chemical machining tool (1) is connected to a guide body (1a) which moveably rests against the inner walls of the respective cavity by means of power-actuated guide elements (2), with the guide body being connected to a flexurally soft and torsionally stiff guide linkage (5) coupled to a feed and rotary drive. Control of the movement of the guide body is accomplished in dependence of at least one wall thickness measured with a measuring device (13, 14) during feed movement.

11 Claims, 3 Drawing Sheets

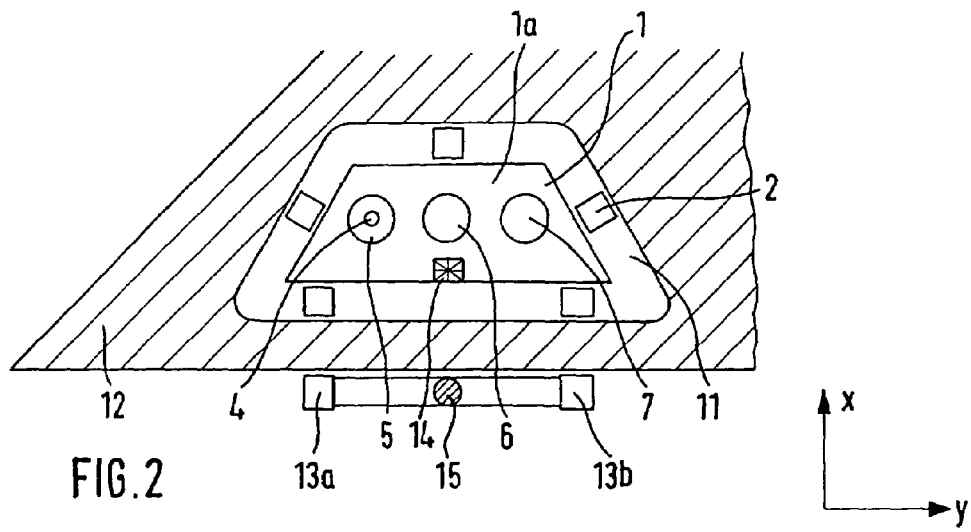
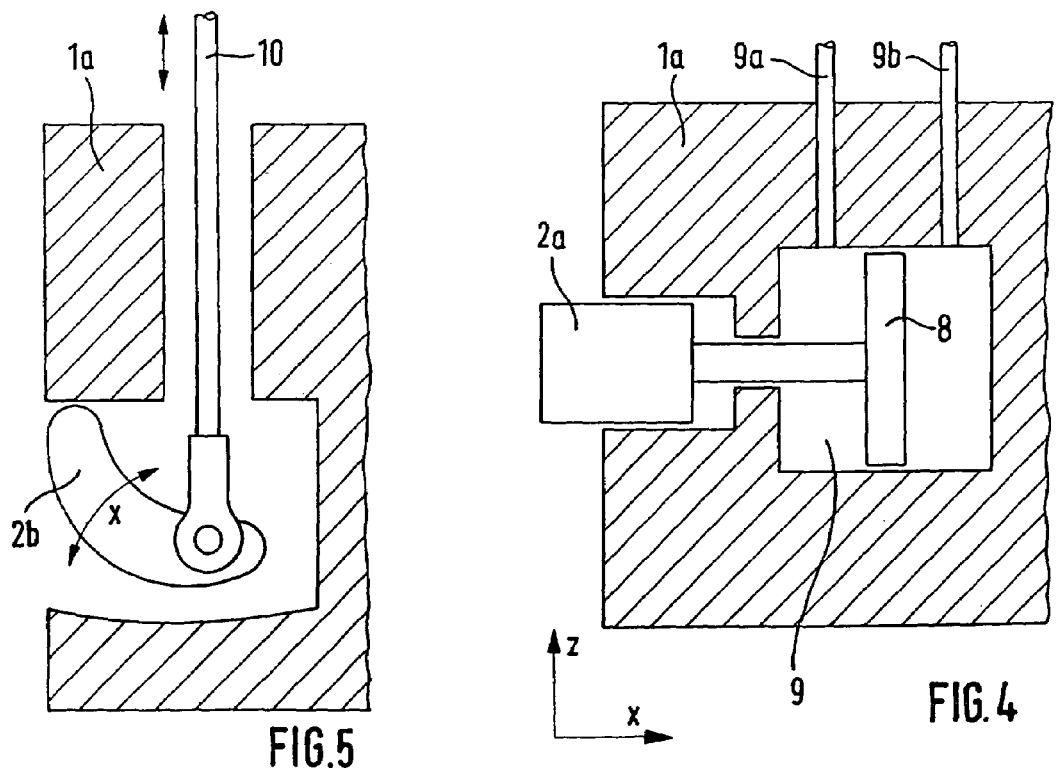

FIXTURE FOR ELECTRO-CHEMICAL MACHINING

This application claims priority to German Patent Application DE10339046.4 filed Aug. 19, 2003, the entirety of which is incorporated by reference herein.

BACKGROUND OF THE INVENTION

This invention relates to a fixture for electro-chemical machining for the production of long, curved cavities in a metallic component acting as an anode, with a working electrode mounted on a power-actuated guide linkage performing a feed movement in the Z-direction in an electrolyte, and in particular, for the manufacture of hollow fan blades for aircraft engines.

Forming processes and corresponding fixtures which are based on the principle of electro-chemical removal of material are generally known. In an electrochemical machining process disclosed in Specification DE 29 03 873, for example, an electrolytic solution flows through the working gap between the two electrodes, i.e. the tool and the workpiece, with material being removed from the workpiece according to the principle of the electrochemical cell and carried off in the form of metal hydroxide in the saturated, continuously outflowing electrolytic solution. With gradual feed of one of the electrodes, a channel with a cross-section conforming to the shape of the tool plus a working gap is produced in the workpiece, for example. However, the span of application of electrochemical material removal (electrochemical machining) for the production of long cavities—for example in the manufacture of hollow blades for aircraft engines from solid material—is limited in that the tool acting as working electrode is unable to follow the complex—curved or twisted—shape of the channel corresponding to the respective workpiece contour and, further, the shape and size of the cross-section of the channel produced cannot be adapted to a workpiece wall whose thickness alters along the channel, which would be requisite for variable material removal.

In the case of fan blades of aircraft engines, it is important that, for example for weight reduction, cavities in the form of channels are produced in the interior of the blades which follow the complex, curved and twisted, blade profile and, as regards the size of the channel cross-section, adapt to the altering blade thickness, in order to remove a maximum of material over a great blade length and produce a lightweight, but robust blade from a prefabricated blank made of solid material, for example titanium. The blades for the fan of an aircraft engine must, on the one hand, be strong enough to withstand the forces arising from natural frequencies, vibration amplitude, centrifugal forces and bird strikes, and, on the other hand, satisfy the requirements for light weight and manufacturing costs lower than the state of the art.

The known methods for the manufacture of hollow fan blades in titanium are based on expensive forming and jointing processes to provide so-called built structures, as disclosed in Specifications U.S. Pat. Nos. 5,692,881 or 6,033,186, for example. For weight reduction, other known blade designs comprise a combination of titanium and carbon fiber composite, with the fiber composite being used on the pressure side of the blades only (U.S. Pat. No. 5,655,883) or a fiber composite core being provided with a metallic shielding (U.S. Pat. No. 5,876,651, DE 196 27 680). These designs of fan blades are also disadvantageous in that they incur high manufacturing investment and cost.

Moreover, as regards the fan blades of smaller or medium-sized aircraft engines, the known lightweight blade designs are even less suitable since the weight saving achievable with these designs is poor in relation to the manufacturing costs and, further, their bird strike strength fails to satisfy minimum requirements.

It has also been suggested to produce, by known electro-erosive methods and fixtures, one or more cavities only in the blade tip of a solid titanium blade to lower the weight of the blank at least in the tip area, thereby helping reduce the centrifugal forces acting on the blade root. The reduction in blade weight obtained by this approach is, however, relatively small.

BRIEF SUMMARY OF THE INVENTION

The present invention, in a broad aspect, provides a fixture for electro-chemical machining which enables long, axially variable cavities to be produced in a solid component, in particular, prefabricated solid fan blades for an aircraft engine, to obtain maximum weight savings.

It is a particular object of the present invention to provide solution to the above problems by a fixture designed in accordance with the features described herein. Further features and advantageous embodiments of the present invention will become apparent from the description below.

A first feature of the present invention is that the working electrode, which removes the material in the electrolyte flow, is mounted to a flexible, torsionally stiff guide linkage which is capable of following a non-vertical, curved contour of the cavity to be produced. The guide linkage is connected to a feed drive and, if applicable, to a rotary drive.

In accordance with a further feature of the present invention, a guide body is arranged between the working electrode and the power-actuated guide linkage, this guide body having a cross-section which approximately corresponds to, but has less cross-sectional area than the cross-sectional shape of the cavity and being provided with guide elements at the side walls which are adjustable by means of an actuating arrangement and rest against the inner wall of the already formed cavity section. Adjustment of the guide elements enables the guide body to be moved in the X and/or Y-direction or also to be rotated, with superimposition of the various movement directions, and the working electrode, for example in the case of a fan blade, to be fed along a desired curvature to follow, for example, the twist of the fan blade.

In accordance with a third feature of the present invention, adjustment of the guide elements in the X-Y-direction or their rotation is accomplished in dependence of the wall thickness of the component forming a hollow body as determined in the respective guiding range of the guide body during feed movement. For this purpose, the present invention provides a measuring device which is tracked parallel to the guide body and which, in terms of control, is linked to the actuating means for the guide elements. The entire control is preferably effected by software. This arrangement enables the long cavity to the produced parallel to a curved outer wall of the respective component. Generally, for the control of the guide body, the contour of the long cavity can, however, be established by way of a specified, variable wall thickness.

In an advantageous development of the present invention, the guide elements can by actuated by mechanical or hydraulic means.

In a further development of the invention, the measuring device for the determination of the wall thickness is connected to the rotatable, torsionally stiff guide linkage by means of a rotary joint and tracked parallel to the guide body on the outside of the component.

Wall thickness measurement can, for example, be accomplished magnetically, with a neodymium magnet being provided on the guide body and with two magnetometer probes being provided on a linkage rotatably connected to the flexurally soft guide linkage.

In accordance with a further feature of the present invention, the working electrode is multi-part and, therefore, variable in both shape and size, allowing cavities with altering cross-section to be produced in the course of a machining process.

Summarizing, then, the fixture according to the present invention enables long cavities to be produced by electrochemical machining which conform to the shape of the component and have a non-vertical, curved axial extension and whose cross-section varies in size and shape. Preferably, curved fan blades for aircraft engines made of solid material can be provided with cavities which widely follow the blade curvature to effectively reduce weight.

BRIEF DESCRIPTION OF THE DRAWINGS

The present invention is more fully described in the light of the accompanying drawings showing preferred embodiments. In the drawings, FIG. 2 is a sectional view of a fixture according to FIG. 1 situated within the cavity formed in the component, FIG. 4 is a detailed view of a guide element of the electrochemical machining tool which is hydraulically actuated for control, and FIG. 5 is a detailed representation of a further embodiment of a guide element, in this case with mechanical actuation.

DETAILED DESCRIPTION OF THE INVENTION

Figure 3:
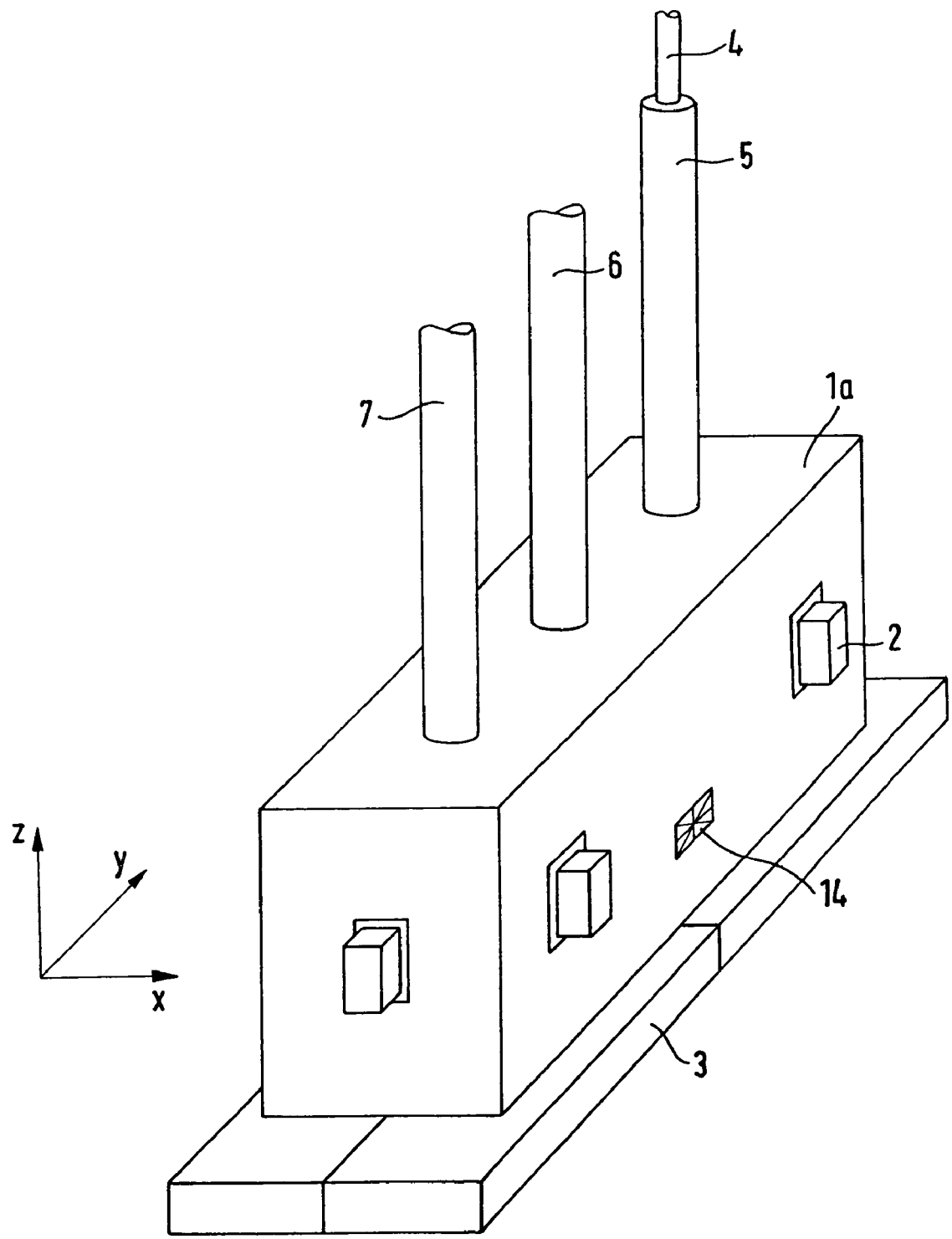
FIG. 3 is a perspective, enlarged representation of a three-dimensionally movable and rotatable electrochemical machining tool controllable in conformance with the desired curvature of the cavity via the residual wall thickness and a tracking arrangement on the outside of the respective component.

The electro-chemical machining tool 1 comprises a guide body 1a made of a non-magnetic material which, on the material-removal side, is provided with an electrode (cathode), in the embodiment a multi-part, variable-size working electrode 3, connected to a current supply cable 4 arranged on the opposite side. The working electrode 3 is trapezoidal, as shown in FIG. 2, and rectangular, but multi-part, as shown in FIG. 3. The multi-part design of the working electrode enables the form and size of the cross-section of the cavity to be produced in the component to be varied in the course of the electrochemical machining process. The current supply cable 4 is integrated into a guide linkage 5 which is firmly connected to the guide body 1a of the electrochemical machining tool 1. The guide linkage 5 comprises a flexurally soft, but torsionally stiff material. By means of the guide linkage 5, a feed movement in the Z-axis in accordance with arrowhead A and, if applicable, a rotary movement in accordance with arrowhead B, is transmitted to the guide body 1a of the electro-chemical machining tool 1 from a driving arrangement not shown. In addition, the guide body 1a can also be moved and rotated in the X-axis and the Y-axis. To produce this proper movement, the guide body 1a is provided at the side walls with movable guide elements 2 which are connected to a driving arrangement and which can be actuated independently of each other. FIGS. 4 and 5 show, each in detailed representation, a guide element 2a for a micro-hydraulic drive or a guide element 2b for a mechanical drive, respectively. According to the hydraulic drive variant shown in FIG. 4, the guide element 2a is connected to piston 8 which is arranged in a pressure cylinder 9 to which pressure hoses 9a and 9b are connected. According to the mechanical drive variant shown in FIG. 5, the guide element 2b is a rotary lever which is swivelable by means of an actuating linkage 10 and a driving arrangement (not shown) connected to the latter. The pressure hoses 9a, 9b or the actuating linkage 10, respectively, are situated in a flexible shroud 6 extending from the guide body 1a to the exterior. In addition, the electro-chemical machining tool 1 is connected to a hose 7 for the continuous supply of electrolyte to the working electrode 3 or into the material removal area, respectively.

Figure 1:
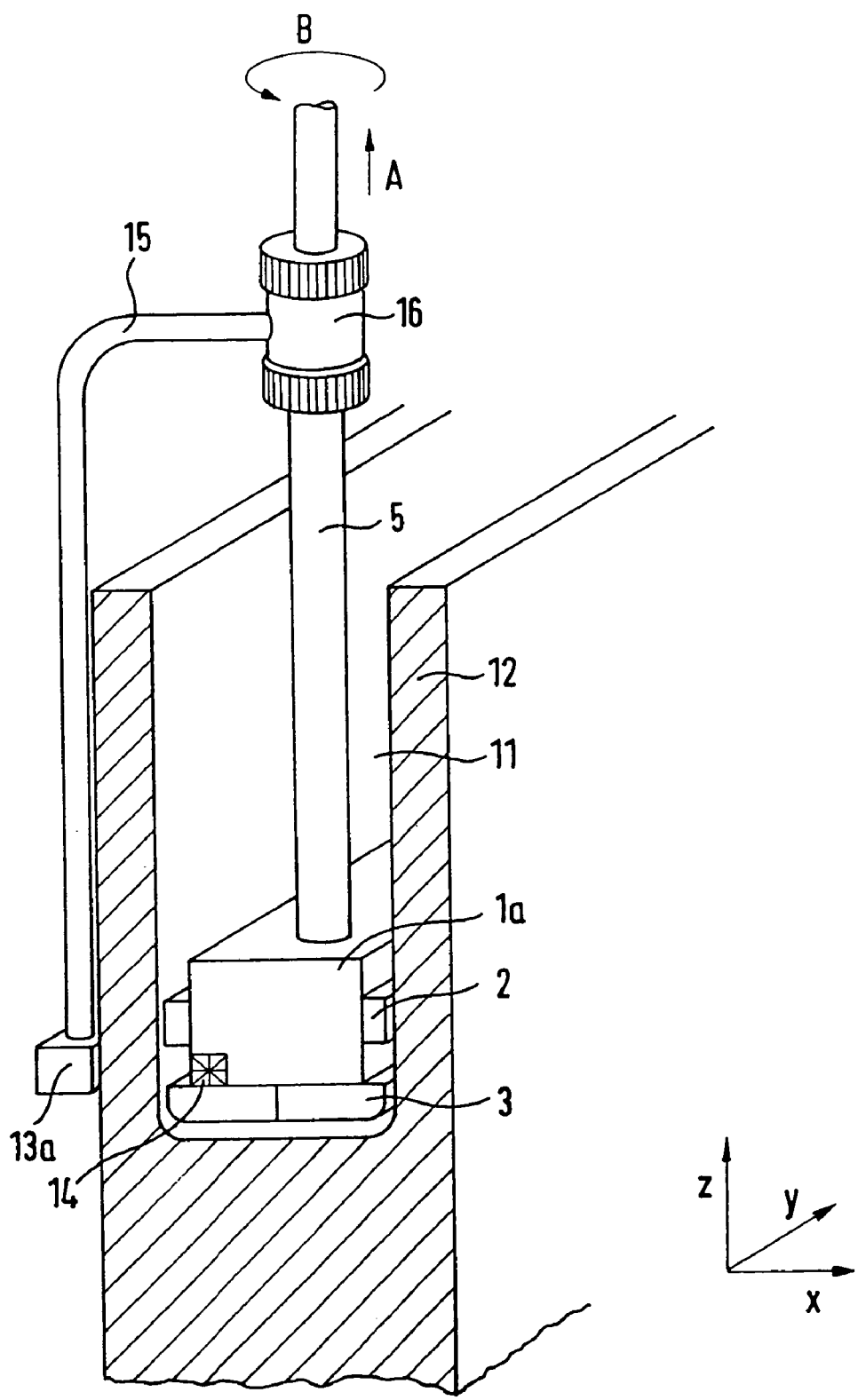
FIG. 1 is a sectional view of a fixture for the electroerosive manufacture of a curved, long cavity in a fan blade of an aircraft engine.

According to FIGS. 1 and 2, the above-described electro-chemical machining tool 1 sits in the upper, still straight part of a cavity 11 produced in the respective component, here a fan blade 12, by electrochemical machining which, in the course of the further machining process, is to be given a curved and twisted contour following the shape of the fan blade 12. For this purpose, the electro-chemical machining tool 1, while feeding in the Z-axis, is moved in the X-axis or the Y-axis and, if applicable, simultaneously rotated by means of the guide elements 2 resting against the inner walls of the already completed portion of the cavity 11, with the flexible guide linkage 5, the shroud 6 and the hose 7 being capable of following this movement. Control of the hydraulic or mechanical actuating arrangement of the guide elements 2 for setting the respective position of the electro-chemical machining tool 1 in the course of the electro-chemical machining operation is accomplished by measuring the wall thickness remaining during the production of the cavity 11 using magnetic or other suitable methods, for example ultrasonic measurement. According to the present embodiment, in which the wall thickness measurement for the control of the movement of the guide elements 2 is accomplished on the basis of a magnetic measuring method, the guide body 1a is provided with a magnet 14, here a neodymium magnet, which mates with two magnetometer probes 13a and 13b arranged at a specified distance on the outside of the fan blade 12 and following the feed movement of the guide body 1a/magnet 14. The two magnetometer probes 13a, 13b are connected to the guide linkage 5, actually via a linkage 15 attached to the guide linkage 5 by means of a rotary joint 16. The external part of the wall thickness measuring device, here the magnetometer probes 13a, 13b, is routed along a path or track defined by the desired contour of the cavity 11 in the fan blade 12.

LIST OF REFERENCE NUMERALS 1 electro-chemical machining tool
1a guide body
2 guide element
2a hydraulically actuated guide element
2b mechanically actuated guide element
3 working electrode
4 current supply cable
5 guide linkage
6 shroud for 9a, b or 10

7 hose for the supply of electrolyte
8 piston of 2a
9 pressure cylinder
9a, 9b pressure hoses
10 actuating linkage of 2b
11 cavity in 12 (working gap)
12 component (workpiece, fan blade)
13a, 13b magnetometer probes
14 magnet (neodymium magnet)
15 linkage
16 rotary joint

What is claimed is:

1. A fixture for electro-chemical machining of a cavity in a metallic component using a working electrode mounted on a power-actuated guide linkage constructed and arranged to perform a Z feed movement in an electrolyte, the metallic component acting as an anode, comprising:
    a guide body connected to the guide linkage, the guide body including a plurality of guide elements positioned on at least one side wall of the guide body,
    at least one actuator for laterally moving the guide elements in an XY plane such that the guide elements can rest against at least one inner wall of the cavity and effect movement of the guide body in the X and Y directions,
    a measuring device attached to the guide body to track parallel to the guide body, the measuring device measuring at least one wall thickness of the metallic component in a respective working zone, the actuator being controlled to move the guide elements in dependence on the at least one wall thickness of the metallic component.

2. A fixture in accordance with claim 1, and further comprising a rotary joint connected to the guide linkage and a measuring device linkage connected to the rotary joint for mounting a portion of the measuring device on an exterior of the metallic component.

3. A fixture in accordance with claim 2, wherein the measuring device is moved along a tracking arrangement provided on the metallic component.

4. A fixture in accordance with claim 2, wherein the measuring device is based on a magnetic field measurement and comprises a magnet arranged on the guide body and two magnetometer probes arranged remotely on the measuring device linkage.

5. A fixture in accordance with claim 1, wherein the measuring device is based on an ultrasonic measuring principle.

6. A fixture in accordance with claim 1, wherein the guide body has a cross-sectional area which conforms to, but is smaller than, an inner contour of the cavity.

7. A fixture in accordance with claim 1, wherein, the actuator is a hydraulic actuator, comprising a pressure cylinder connected to a hydraulic fluid supply via pressure hoses and a piston movable in the pressure cylinder connected to at least one guide element, the pressures hoses being routed to an exterior via a shroud.

8. A fixture in accordance with claim 1, wherein the guide elements are designed as rotary levers deployable from the guide body which are connected to the at least one actuator by an actuating linkage routed to the exterior via a shroud.

9. A fixture in accordance with claim 1, and further comprising the working electrode, the working electrode comprising a plurality of electrode plates which are shiftable relative to each other to change a shape and size of the working electrode, thus enabling across-sectional area of the cavity to be altered.

10. A fixture in accordance with claim 1, and further comprising the guide linkage, the guide linkage being flexurally soft and torsionally stiff and coupled to a feed and rotary drive.

11. A fixture for electro-chemical machining of a cavity in a metallic component using a working electrode mounted on a power-actuated guide linkage constructed and arranged to perform a Z feed movement in an electrolyte, the metallic component acting as an anode, comprising:
    a guide body connected to the guide linkage, the guide body including a plurality of guide elements positioned on at least one side wall of the guide body,
    a plurality of actuators for laterally moving the guide elements in an XY plane such that the guide elements can rest against at least one inner wall of the cavity and effect movement of the guide body in the X and Y directions with respect to the metallic component.

* * * * *